United States Patent [19]
Letschert et al.

[11] Patent Number: 6,004,391
[45] Date of Patent: Dec. 21, 1999

[54] PIGMENTS FOR THE PRODUCTION OF PURPLE CERAMIC DECORATION, PROCESS FOR THE PRODUCTION THEREOF AND USE THEREOF

[75] Inventors: Hans-Peter Letschert; Jenny Wilfert, both of Hanau, Germany

[73] Assignee: Cerdec Aktiengesellschaft Keramische Farben, Frankfurt, Germany

[21] Appl. No.: 08/969,366

[22] Filed: Nov. 28, 1997

[30] Foreign Application Priority Data

| Nov. 28, 1996 | [DE] | Germany | 196 49 067 |
| Feb. 6, 1997 | [DE] | Germany | 197 04 470 |
| Sep. 6, 1997 | [DE] | Germany | 197 39 124 |

[51] Int. Cl.$^6$ .................................................. C09C 1/62
[52] U.S. Cl. .......................... 106/403; 106/404; 106/425; 106/426; 106/428; 106/432; 106/435; 106/436; 106/438; 106/439; 106/441; 106/442; 106/446; 106/450; 106/481; 427/214; 427/217
[58] Field of Search ................................. 106/403, 425, 106/436, 450, 481, 426, 428, 438, 439, 441, 442, 446, 432, 435, 404; 427/214, 217

[56] References Cited

U.S. PATENT DOCUMENTS

| 5,252,522 | 10/1993 | Dorbath et al. | 106/403 |
| 5,589,273 | 12/1996 | Dorbath et al. | 428/433 |
| 5,707,436 | 1/1998 | Fritsche et al. | 106/403 |

FOREIGN PATENT DOCUMENTS

| 3731174 | 3/1989 | Germany . |
| 4106520 | 9/1992 | Germany . |
| 4411104 | 10/1995 | Germany . |

OTHER PUBLICATIONS

Patent Abstracts of Japan, vol. 013, No. 529 (C–658), Nov. 27, 1989 & JP 01 215865 A (Miyoshi Kasei:KK), Aug. 29, 1989.

Chemical Abstracts, vol. 98, No. 26, Jun. 27, 1983, Columbus, Ohio, US; abstract No. 220740, Andreica, Victoria et al.: "Ceramic colors based on colloidal gold", XP002095657 & RO 64 442 A (Institutul De Cercetari Pentru Industria Sticlei Si Ceramicii Fine, Ro).

*Primary Examiner*—Anthony Green
*Attorney, Agent, or Firm*—Weneroth, Lind & Ponack, L.L.P.

[57] ABSTRACT

Purple pigments according to the invention based on a stovable support material, in particular a glass frit, having a coat applied by coprecipitation of an oxide hydrate of one or more elements from the range comprising Al, Si, Sn, Pb, Ti, Nb, Ta, Sc, Y, La, Ce and Zn and a water-insoluble gold compound or colloidal gold are distinguished from prior art pigments of a similar composition by improved color stability in high temperature firing. The pigments are obtainable in the aqueous phase by coprecipitation of an oxide hydrate and a gold compound or colloidal gold in the presence of a support material and in the absence of a reducing agent. Pigments containing gold compounds assume a purple color on heat treatment or by chemical reduction. Preferred pigments containing gold compounds, which may directly be used as decorative colorants, conveniently develop their color during firing of the decoration.

19 Claims, No Drawings

PIGMENTS FOR THE PRODUCTION OF PURPLE CERAMIC DECORATION, PROCESS FOR THE PRODUCTION THEREOF AND USE THEREOF

SPECIFICATION

This invention relates to the production of pigments for the production of purple ceramic decoration, to a process for the production of the pigments and to the use thereof. The pigments are based on a stovable support material, in particular a glass flux, an oxide hydrate and a gold compound or colloidal gold. Both colorless and colored pigments according to the invention, which may be used directly as a decorative colorant, develop a brilliant purple color on firing which is stable even at elevated firing temperatures.

BACKGROUND OF THE INVENTION

Purple pigments based on ceramic materials and colloidal gold may be obtained in various manners and have long been used for producing ceramic decoration and for pigmenting plastics, lacquers, cosmetics, and as glass colorants and decorative colorants.

Until recently, the production of purple pigments comprised several processing stages: (a) precipitation of Cassius gold purple in gel form (colloidal gold adsorbed on tin(IV) oxide hydrate) from an aqueous gold salt solution by means of a tin(II) salt, (b) mixing the moist gold purple with finely ground glass, (c) presintering the mixture at 600 to 800° C., wherein the gold particles are at least partially enclosed in glass and (d) finely grinding the sintered material and, where necessary, establishing the required hue by adding silver compounds and/or other fluxes. Serious disadvantages of this process are that separation of the gold purple in gel form from the aqueous solution of the precursor (a) is very difficult, the hue of the finished pigment is affected in a poorly reproducible manner by the ageing of the gold purple (for example a brown coloration in the event of partial drying) and grinding stages which reduce the space/time yield and an energy-intensive sintering stage are also required. The pigments produced in this manner have furthermore been found not to be sufficiently stable in color at relatively high firing temperatures (of around 1200° C.), i.e. they fade under such firing conditions.

There has been no lack of attempts to improve the process outlined above:

More readily filterable coprecipitates of colloidal gold and the oxide hydrates may be obtained by coprecipitating a gold purple in the presence of oxide hydrate-forming substances, such as Al and Sn salts, wherein the hue of the coprecipitates is simultaneously more readily reproducible and more resistant to ageing—reference is made, by way of example, to RO patent 64442 B (Chemical Abstracts 98 (26): 22 07 40e). However, the remaining processing stages for production of the purple pigments correspond to the above-mentioned stages (b), (c) and (d), such that the overall process still demands considerable effort. According to DD-PS 143 423, the gold purple may also be precipitated in the presence of inert material, for example kaolin, feldspar or pegmatite. The purple, moist precipitate is then homogeneously mixed with a glass flux and, in order to control hue, additionally with a silver carbonate, wet ground, sintered at 650 to 680° C. and ground again. This process too is associated with the above-mentioned disadvantages, in particular with inadequate color stability at a relatively high firing temperature.

Purple pearlescent pigments based on lamellar particles coated with metal oxides, in particular mica coated with $TiO_2$, having an outer layer of tin oxide accommodating colloidal gold, are known c.f. DE-OS 37 31 174. The coating containing gold is here always located on a metal oxide layer, which must first be applied onto a lamellar support. In the process according to DE-OS 37 31 174, a metal oxide or metal oxide hydrate layer, in particular a layer of $TiO_2$ or titanium dioxide hydrate, is first precipitated onto lamellar substrates, in particular mica particles, by hydrolyzing metal salts, then tin dioxide or tin dioxide hydrate and elemental gold in colloidal form are simultaneously precipitated in the aqueous phase by hydrolyzing a tin(IV) salt in the presence of a gold salt and a reducing agent, in particular a tin(II) salt. The precipitation stages are followed by a calcination stage at 700 to 1100° C. The production of such pigments is very complicated and thus expensive.

DE-OS 41 06 520 (U.S. Pat. No. 5,252,522) discloses purple pigments based on glass frits having an average particle diameter in the range from 0.5 to 50 μm and a coating containing 0.05 to 5 wt. % of colloidal gold and optionally other hue-modifying metals. The coating is provided by reducing a water-soluble gold compound in an aqueous suspension in the presence of a glass frit by means of a reducing agent, such as glucose. The resultant pigments exhibit unsatisfactory color stability during high temperature firing, i.e. they fade as the firing temperature increases.

According to DE-OS 44 11 104 (U.S. Pat. No. 5,707,436), purple pigments may also be produced by mixing and/or grinding a support material and a gold compound in dry form or by bringing an aqueous solution or suspension of a gold compound and a support material into contact, wherein a precipitating agent for a soluble gold compound, such as ammonia, may be present, and then heat treating the mixture at a temperature above the decomposition temperature of the gold compounds, but below the sintering temperature of the support material, wherein the gold compound is converted into colloidal gold. According to DE-OS 44 11 103 (U.S. Pat. No. 5,589,273), purple decoration may also be produced using a pigment precursor which has been produced as above but not yet heat treated and is thus substantially colorless. In the pigments or pigment precursors described in the two latter-stated documents, the chromophoric metal colloid or the noble metal compound respectively coat the surface of the material without additional oxide hydrate. At a stoving temperature of above 1000° C., such pigments or pigment precursors exhibit inadequate color brightness and reduced color depth as the firing temperature rises.

U.S. Pat. No. 4,839,327 discloses products containing gold which are suitable as catalysts and consist of a finely divided substrate, such as a metal oxide or mixed oxide, having ultra-fine gold particles of a particle diameter of less than 500 nm located thereon. The production process comprises firstly a precipitation of gold hydroxide from a water soluble gold compound onto the substrate in the aqueous phase followed by conversion of the gold hydroxide into colloidal gold by treatment with a reducing agent or by heat treatment. This document mentions neither the color of the product nor the use thereof as a pigment. The thermal stability of the products obtained using this process does not correspond to that required for high temperature firing, i.e. in particular in the range from above 1100 to 1300° C.

Finally, pigments based on glaze-stable compounds, such as $ZrSiO_4$, $SnO_2$ or $Al_2O_3$, and colloidal gold are known from GB patent 1 436 060. Production proceeds by means of a solid-state reaction. The pigments contain no oxide hydrates and the color has poor brightness and has a dirty appearance.

DESCRIPTION OF THE INVENTION

An object of the invention is to provide pigments for the production of purple ceramic decoration having improved high temperature stability, wherein the color of the stoved decoration is attributable to colloidal gold. The pigments should be usable in high temperature firing, i.e. at above 1000° C. and in particular in the range from above 1100 to approx. 1300° C., and, at a given gold content in the pigment, should give rise to more intensely colored decoration than when prior art pigments based on Cassius gold purple precipitated in the presence of a support material are used. A further object relates to the provision of suitable processes for the production of the pigments.

The object is achieved by a pigment suitable for the production of purple ceramic decoration in high temperature firing, substantially consisting of (a) one or more finely divided support materials from the range of stovable materials, in particular glass frits, (b) one or more oxide hydrates of one or more of the elements from the range comprising Al, Si, Sn, Pb, Ti, Zr, Nb, Ta, Sc, Y, La, Ce and Zn and (c) one or more water-insoluble gold(III) or gold(I) compounds or colloidal gold, wherein the support material and oxide hydrate, calculated as oxide, are present in a weight ratio in the range from 10 to 0.1 and the gold content of the pigment is between 0.05 and 10 wt. %, and obtainable by a process comprising coprecipitation of the one or two or more oxide hydrates and the water-insoluble gold compound (s) or the colloidal gold in the presence of the support material in an aqueous or aqueous-organic phase in the absence of a reducing agent for the gold compound(s), wherein one or more soluble Au compounds or a solution containing colloidal gold and one or more soluble compounds of the metals present in the oxide hydrate and at least one precipitating agent are used and, where water-insoluble Au compounds present in the coprecipitate are to be converted into colloidal gold, reduction is carried out following the coprecipitation by means of a conventional reducing agent or by thermal decomposition at 100 to 300° C.

Pigments according to the invention which contain a gold compound in the coprecipitate are usually substantially colorless. Where coprecipitation is performed using a water soluble sulphide, however, the coprecipitate is brown. Substantially colorless or brown pigments containing at least one gold compound are referred to below as unreduced pigments. The phrase "substantially colorless" should be taken to mean that, while the unreduced pigment may indeed exhibit a color originating from the support material, the oxide hydrate and the precipitated gold compound, it does not exhibit a purple color, which is only obtained by thermal decomposition of the gold compound during firing of the decoration or by a chemical reduction stage. These unreduced pigments are conventionally white, slightly yellowish or greyish or, as disclosed above, also brown. Unreduced pigments according to the invention based on a coprecipitate of an oxide hydrate and a gold compound produced in the presence of a support material are particularly preferred not only because they are the simplest to produce but also because, at a given gold content, they give rise on high temperature firing to more intensely colored purple decoration than pigments according to the invention which contain colloidal gold due either to the use of a solution of a gold colloid or to reduction of a coprecipitate containing a gold compound subsequent to the coprecipitation and are thus themselves already of a purple color. It is not yet clear why the unreduced pigments according to the invention, i.e. those containing a gold compound, have better thermal stability, i.e. are of a more intense color after high temperature firing of the decoration, than pigments according to the invention which contain colloidal gold. Surprisingly, the thermal stability of both types of pigment according to the invention is much greater than that of prior art pigments of a similar composition and identical gold content. The low thermal stability of prior art pigments has prevented practical use thereof in high temperature firing of decoration.

The pigments according to the invention substantially consist of one or more finely divided support materials, one or more oxide hydrates and one or more water-insoluble gold compounds or colloidal gold. The term "substantially" should be taken to mean that the pigments may additionally contain up to approx. 10 wt. % of other substances, such as one or more hue-modifying metal compounds of elements from the range comprising Ag, Cu, Co, Ni, Ru, Rh, Pd, Os, Ir and Pt compounds in a total quantity below that of the gold compound. A small but effective quantity of an organic pigment may furthermore be present in the substantially colorless pigments. A pigment colored in this manner has the advantage that a print produced therewith is readily visible before firing. Finally, conventional pigment auxiliaries, such as flow auxiliaries, may also be present.

Materials stovable during firing of the decoration, such as finely ground glass frits, natural and synthetic silicates, such as aluminosilicates, together with metal oxides and mixed oxides, such as $SiO_2$, $ZrO_2$, $SnO_2$, $TiO_2$ and colorless spinels, are used as the support material for the pigments. Particularly preferred support materials are finely ground glass frits. Glass frits of various different chemical compositions are known. Composition determines the properties of the glass frits, in particular the applicationally significant melting behavior and coefficients of expansion. When producing purple pigments which are to be stoved at elevated temperature, i.e. at a temperature of above 1000° C., in particular of above 1100 to approx. 1300° C., the person skilled in the art will select such a glass frit which melts smoothly at the intended firing temperature and has a favorable influence on color development. Average grain diameter is conveniently in the range between 1 and 10 $\mu$m, and 90% of the particles should preferably be smaller than 20 $\mu$m. It is possible by making a selection from the wide variety of commercially available glass frits, to base the pigments according to the invention on such a glass frit which is best tailored to the support to be decorated. Thereby, defects such as chips, cracks, pin holes and cloudiness in the ceramic decoration may thus be avoided.

The term "oxide hydrates" is taken to mean precipitates in gel form, as are obtained by precipitation of soluble compounds of Al, Si, Sn, Pb, Ti, Zr, Nb, Ta, Sc, Y, La, Ce and Zn in the form of oxides and/or hydroxides from aqueous solutions. In the soluble compounds and the oxide hydrates, Si, Sn, Ti, Zr and Ce are tetravalent; Nb and Ta are pentavalent; Al, Sc, Y, La and optionally also Ce are trivalent. The term "oxide hydrates" includes "oxide-forming gels" and also those precipitates as are obtained by drying the precipitates under conventional conditions, generally of below 100° C., or, in the event of the heat treatment possible according to the invention, at 100 to 300° C. in order to decompose the gold compound.

Preferred oxide hydrates formed during the coprecipitation are those of aluminum, silicon, tin, titanium and zirconium. Pigments having an oxide hydrate of tetravalent tin are particularly preferred.

It is essential to the invention that the pigments contain, in addition to a gold compound or colloidal gold, both a support material and an oxide hydrate. The support material and the oxide hydrate-forming soluble metal compounds are generally used in a ratio such that the weight ratio of support material to oxide hydrate, calculated as oxide, in the pigment is in the range between 10 and 0.1. A preferred weight ratio is in the range from 10 to 1, in particular from 6 to 2. Where coprecipitation is performed in the absence of a support material and the support material is subsequently mixed with the coprecipitate, pigments which are not according to the invention are obtained which, while they do indeed also develop a purple color on firing of the decoration, have substantially lower thermal stability and color intensity than those unreduced pigments according to the invention of an identical gold content.

The unreduced pigments according to the invention contain a gold(I) or gold(III) compound which is substantially water-insoluble or a mixture of various insoluble gold compounds, as are obtained during the coprecipitation performed in the absence of a reducing agent for the gold compounds from a gold(I) or preferably gold(III) compound soluble in water or a homogeneous aqueous-organic medium and the precipitating agent. Both organic and inorganic gold compounds may be used as the soluble gold compound. Suitable soluble gold compounds are those from the range comprising lithium, sodium and potassium dicyanoaurate(I), tetrahaloauric(III) acid and hydrates thereof, in particular tetrachloroauric acid and hydrates thereof, lithium, sodium and potassium disulphitoaurate(I), alkali metal dithiosulphatoaurate(I), gold(I) thiolates, in particular those of water-soluble mercaptocarboxylic acids and mercaptoamino acids. Since coprecipitation proceeds using conventionally alkaline precipitating agents, such as in particular alkali metal hydroxide, alkali metal carbonate, alkali metal sulphide and aqueous or gaseous ammonia, both the substantially water-insoluble gold(I) and gold(III) compounds are gold oxides or hydroxides and gold ammine hydroxides and gold sulphides. Since tetrachloroauric acid is a particularly preferred water-soluble gold compound and sodium hydroxide solution or aqueous ammonia a particularly preferred precipitating agent, the substantially water-insoluble gold compounds in the unreduced pigments are gold(III) hydroxide and gold ammine hydroxides. A water-soluble sulphide or hydrogen sulphide, alone or preferably in combination with other bases, such as sodium hydroxide solution, may be used as a further precipitating agent.

Colloidal gold may be produced in an aqueous or aqueous-organic phase in a known manner by reducing a soluble gold compound. *Handbuch der präparativen anorganischen Chemie* by G. Brauer, 3rd edition, volume II, page 1011 describes the reduction of $HAuCl_4$ in boiling water with formaldehyde as the reducing agent and $K_2CO_3$ as the acid acceptor. Literature references to other possible preparative methods are also given. G. Frens investigated gold colloids produced using the citrate method, c.f. *Nature Physical Science,* volume 241 (1973), 20–22. An aqueous solution of colloidal gold obtained in this manner is used in the coprecipitation of pigments according to the invention containing colloidal gold.

The gold content of pigments according to the invention is 0.05 to 10 wt. %, preferably 0.5 to 5 wt. %. Pigments having a gold content of between 0.5 and 2.5 wt. % are particularly preferred. Since it has not hitherto been explicable why both the unreduced pigments according to the invention and the pigments according to the invention containing reduced or directly colloidal gold exhibit, during firing of the decoration, substantially higher thermal stability than prior art pigments of a similar composition, the pigments according to the invention may be characterized by the process. The essential stage of the process is coprecipitation of the one or two or more oxide hydrates with the gold compound(s) or the colloidal gold in the presence of a support material in an aqueous or aqueous-organic phase. It is essential to the invention that no reducing agent to reduce the gold compound(s) to colloidal gold is present during the coprecipitation. Where the pigments containing at least one gold compound obtained from coprecipitation are to be converted into purple pigments containing colloidal gold, this is possible by means of reduction subsequent to coprecipitation using conventional reducing agents or by thermal decomposition of the gold compound in the pigment at 100 to 300° C. Thermal decomposition is less preferred than chemical reduction.

The pigments according to the invention may accordingly be produced by coprecipitating one or more oxide hydrates of one or more elements from the range comprising Al, Si, Sn, Pb, Ti, Zr, Nb, Ta, Sc, Y, La, Ce and Zn and one or more substantially water-insoluble gold(III) or gold(I) compound (s) or introduced colloidal gold in an aqueous or aqueous-organic phase in the presence of one or more finely divided support materials suspended therein from the range of stovable materials in the absence of a reducing agent for gold compounds, wherein one or more soluble compounds of the metals contained in the oxide hydrate, one or more water-soluble gold compounds or a solution containing colloidal gold and one or more precipitating agents are used in a quantity such that a weight ratio of support material to oxide hydrate, calculated as oxide, in the range from 10 to 0.1, in particular from 10 to 1, and a gold content in the range from 0.05 to 10 wt. %, in particular from 0.5 to 5 wt. %, is obtained in the pigment, and the coprecipitate is then separated from the liquid phase and dried or, where insoluble gold compounds containing the coprecipitate are to be converted into colloidal gold, the coprecipitate is either treated in the aqueous phase with a reducing agent, then separated from the aqueous phase and dried or the dried coprecipitate is heat treated at 100 to 300° C.

Water-soluble hue-modifying compounds of Ag, Cu, Co, Ni, Ru, Rh, Pd, Os, Ir and Pt may also be present during coprecipitation in addition to the components essential to the invention, i.e. one or more support materials, one or more oxide hydrate-forming metal compounds and one or more soluble gold compound(s) or a solution of colloidal gold. These hue-modifying components are also precipitated substantially as hydroxides or oxide hydrates during the coprecipitation.

Coprecipitation is performed in an aqueous or aqueous-organic phase. Where organic solvents are present, they are water-soluble organic solvents, such as water-soluble alcohols, ketones and ethers. Coprecipitation preferably proceeds in an aqueous or at least predominantly aqueous phase. Water-soluble organic solvents are generally used only in the event that one of the reaction components, for example the gold compound or an oxide hydrate-forming compound, is not sufficiently water-soluble or an aqueous solution of this compound is not stable. Coprecipitation is conventionally performed at a temperature in the range from 5 to 100° C., in particular from 15 to 30° C., with vigorous stirring.

The soluble metal compounds used in the process are those which may be precipitated as an oxide hydrate or oxide-forming gel in an aqueous or aqueous-organic phase by hydrolysis with subsequent condensation and/or by modifying the pH value. Suitable soluble compounds are, for example, tin(IV) chloride and hydrates thereof, tin(IV) sulphate dihydrate; $AlCl_3$, Al acetate, Al sulphate, Al nitrate; Zr(IV) sulphate tetrahydrate, $Zr(NO_3)_4$, zirconyl chloride hydrates; chlorides, nitrates or acetates of scandium, yttrium, lanthanum, cerium and zinc; water-soluble silicates, in particular water glass; titanyl sulphate. A preferred source of oxide-forming gels of Si, Ti, Zr are the monomeric or oligomeric alkoxy compounds of these elements, wherein the alkoxy groups preferably have 1 to 3 C atoms and, in addition to alkoxy groups, OH groups and oxygen bridges between two metal atoms may also be present. Examples are $Si(OC_2H_5)_4$, $Ti(OC_2H_5)_4$, $Zr(OC_2H_5)_4$, $(HO)_{n-3}(C_2H_5)_n Si$—$O$—$Si(C_2H_5)_n(OH)_{n-3}$ where n=1, 2, 3.

Coprecipitation, in which one or more dissolved oxide hydrate-forming compounds, one or more dissolved gold(I) or preferably gold(III) compounds or colloidal gold introduced as a solution and optionally additionally one or more dissolved hue-modifying compounds are precipitated in an aqueous or aqueous-organic phase in the presence of a finely divided support material suspended therein by means of one or more precipitating agents, may be performed in various manners. The precipitating agents are generally basic compounds or compounds having a basic action in the aqueous phase, in particular an alkali metal hydroxide or ammonia. It may be convenient additionally to use, for example, a water-soluble sulphide or hydrogen sulphide. The pH value is simply established with these precipitating agents. These precipitating agents also ensure that both the oxide hydrate-forming compound(s) and the gold compound(s) or the introduced colloidal gold and optional hue-modifying compounds are precipitated substantially simultaneously. During coprecipitation, the particles of the support material suspended in the reaction mixture are enclosed with the coprecipitate. In the coprecipitation, the precipitating agent may initially be introduced into the suspension containing the support material and a solution of an oxide hydrate-forming compound and a solution of a gold compound or colloidal gold and optionally a solution of hue-modifying compounds or a mixture of the stated solutions may be introduced into the initial mixture. The quantity ratios of the alkaline precipitating agent(s) and the acids present and/or formed by hydrolysis of oxide hydrate-forming compounds are adjusted relative to each other such that coprecipitation proceeds as completely as possible. The pH value at the end of coprecipitation may here be within either the acidic or the alkaline range, for example in the range from 0.5 to 12. As is evident from the Examples, final pH values in the range from approx. 0.5 to approx. 10.5 are preferred. The coprecipitation may be controlled by temperature as well as by pH value. According to an alternative embodiment of the coprecipitation, a solution of an oxide hydrate-forming compound and an aqueous solution of the preciptating agent or a combination of precipitating agents may simultaneously be introduced into a suspension containing the support material and a dissolved gold compound or colloidal gold. According to another alternative, a solution of the precipitating agent may be introduced into a suspension containing the support material, a dissolved gold compound or colloidal gold and a dissolved oxide hydrate-forming compound. When selecting the production variant for coprecipitation using a solution of colloidal gold, it must be borne in mind that colloidal gold is sensitive to electrolyte content such that the particle size of the Au particles and consequently the color may be affected. After coprecipitation, which is conventionally performed with vigorous stirring, the resultant coprecipitate may be separated from the liquid reaction medium, washed and dried in a conventional manner.

In order to produce pigments containing colloidal gold, a coprecipitate containing an insoluble gold compound may be treated before or preferably after separation thereof from the liquid reaction medium using a conventional reducing agent for the gold compound, optionally in the presence of hue-modifying compounds. Reduction conventionally proceeds in an aqueous medium at room temperature or moderately elevated temperature. Examples of effective reducing agents are sulphites, thiosulphates, dithionites, nitrites, phosphites, hypophosphites and the acids underlying the stated salts, hyponitrites and $H_2N_2O_2$, oxohyponitrites and $H_2N_2O_3$, hydrazine, hydroxylamine and salts thereof, hydrogen peroxide, metal hydrides and complex metal hydrides together with aldehydes, such as in particular formaldehyde, Urotropin and glucose. The reducing agent is preferably used in a superstoichiometric quantity relative to the quantity required to reduce the gold compounds and optional hue-modifying compounds. The reduced pigment is separated from the aqueous reaction medium and dried.

Instead of converting the gold compound(s) in a coprecipitate into colloidal gold using reducing agents, it is also possible to perform this conversion by thermal decomposition of the gold compound. To this end, the unreduced coprecipitate is heat treated at 100 to 300° C., wherein this treatment is preferably performed in a fluidized bed reactor. In the case of heat treatment at up to 300° C., conversion of the oxide hydrate into an oxide containing no hydroxyl groups is not complete. Pigments according to the invention which contain colloidal gold may be obtained by direct use of a solution of colloidal gold in the coprecipitation as well as by the above-stated chemical reduction of the coprecipitate or heat treatment thereof. This embodiment results in lower reducing agent consumption and a higher space-time yield than the process comprising a reduction stage after the coprecipitation.

The pigments according to the invention may be used in the same manner as prior art pigments for coloring glazes, enamels, plastics, as glass colorants and decorative colorants and thus also for the production of purple ceramic decoration. The purple, reduced pigments are preferably suitable for coloring plastics. Pigments may be used which are specifically tailored to particular applications: i.e. pigments based on low melting frits for glass colorants, those based on higher melting frits for porcelain colorants and fast firing colorants and colorants for wall tiles. The rheological behavior of the glazes and enamels is not modified by the pigment adapted to the glass frit of the glazes and enamels. For decorative applications, the pigment is conventionally converted into a paste with a liquid medium, the paste screen printed onto a transfer support and the transfer provided with a film coating in a known manner. The transfer is transferred onto the support to be decorated in a known manner and then stoved. Firing temperatures are determined by the material to be decorated. While firing of the decoration on ceramic supports has hitherto mainly been performed in the range between 800 and 900°, there is currently increased interest in so-called high temperature rapid firing, wherein the pigments may be stoved at a temperature of above 1000° C., in particular of above 1100 to approx. 1250° C.

The essential advantage of the pigments according to the invention is that they exhibit greater high temperature stability and thus are more intensely colored, and brighter decoration may be obtained than when using prior art pigments of a similar type, which furthermore often yield opaque and matt decoration. This high temperature stability is distinguished in that the pigments fade less severely at higher firing temperatures than do prior art pigments. Another advantage of the pigments according to the invention containing a gold compound is that they may be obtained in a particularly simple manner and render a reduction stage superfluous as the actual reduction of the gold compound to colloidal gold does not occur until during the firing. Various pigments of differing hues may be obtained by selection of the support material and the oxide hydrate-forming compound.

The following Examples illustrate the invention in greater detail. The Examples cover both the production and use of pigments according to the invention and, for reasons of comparison, the use of pigments produced using prior art processes.

EXAMPLE 1

525 g of a high temperature rapid firing (HTS) frit (no. 90234 from Cerdec AG substantially consisting of $SiO_2$, PbO, CaO, $B_2O_3$ and $SnO_2$; grain size distribution: 90% smaller than 10 µm), 1000 ml of concentrated ammonia solution and 1700 ml of water were introduced into a glass beaker. A solution (pH<1) prepared from 305 g of tin tetrachloride pentahydrate ($SnCl_4$.5 $H_2O$) and tetrachloroauric acid hydrate ($HAuCl_4$.$H_2O$) in a quantity corresponding to 8.8 g of gold in 1250 ml of water was then added dropwise within 15 minutes with stirring. Addition was performed at room temperature and pH fell during addition from 12.5 to 9. The resultant, substantially uncolored and unreduced pigment was filtered out, washed and dried at 60° C. The calculated weight ratio of glass frit to the oxide underlying the oxide hydrate, in this case $SnO_2$, was 4. The gold content of the pigment was 1.34 wt. %, relative to the sum of glass frit plus $SnO_2$.

The resultant pigment was converted into a paste with a printing medium (80820 from Cerdec AG) (56 parts by weight of pigment and 44 parts by weight of medium) and applied onto a glazed porcelain surface using a known indirect screen printing method and stoved for 30 minutes at 1220° C. The typical purple color was obtained; the color values are measured using a Hunter Lab spectrophotometer and converted into L*, a* and b* values of the CIE-Lab system (DIN 5033, part 3):

L=38; a=29; b=3.1 (Hunter)

L*=45.8; a*=34.9; b*=−3.9 (CIE-Lab)

The previously obtained colored porcelain surface was stoved for a second time for 30 minutes at 1220° C. in order to investigate its refiring stability. No visually discernible change in color occurred.

L=38.6; a=29.3; b=3.26 (Hunter)

L*=45.5; a*=34.3; b*=−4.2 (CIE-Lab)

EXAMPLE 2

A suspension of 100 ml of 32% ammonia solution, 100 ml of water, 0.1 g of AgCl (for hue modification) and 17.5 g of a lead-free glass frit (no. 10150 from Cerdec AG) having $SiO_2$, $B_2O_3$ and $Na_2O$ as its principal constituents was made up as the initial mixture. A solution prepared from 25 g of $SnCl_4$.5 $H_2O$ and $HAuCl_4$.$H_2O$ corresponding to 0.6 g of gold in 200 ml of water was then added dropwise to the suspension with stirring. The final pH value was 8.5. The resultant pigment was filtered out, washed and dried at 60° C. The weight ratio of glass frit to $SnO_2$ was 1.6, the gold content, relative to the sum of frit plus $SnO_2$, was 2.1 wt. %. After indirect printing onto glazed porcelain and 30 minutes' firing at 1220° C., the color values were (CIE-Lab):

L*=42.7; a*=20.4; b*=−6.9.

EXAMPLE 3

A suspension of 200 ml of water, 150 ml of a 5% NaOH solution and 10 g of a lead-free glass frit (no. 10150 from Cerdec AG) was made up as the initial mixture. A solution of 17.5 g of tin tetrachloride and 0.2 g of gold in the form of $HAuCl_4$.$H_2O$ in 50 ml water was then added dropwise with stirring. The resultant pigment was filtered out, washed and dried at 60° C. The weight ratio of frit to $SnO_2$ was 1.3, the gold content 1.14 wt. %, relative to the sum of frit plus $SnO_2$.

The CIE-Lab values of the pigment after stoving on glazed porcelain at 1220° C. for 30 minutes were:

L*=38.8; a*=32.1; b*=−5.7.

EXAMPLE 4

A suspension of 100 ml of water, 27 g of $ZrOCl_2$.8 $H_2O$, 0.1 g of gold in the form of $HAuCl_4$.$H_2O$ and 10 g of a lead-free glass frit (no. 10150 from Cerdec AG) was made up as the initial mixture. A solution prepared from 20 g of sodium water glass and 35 ml of 5 molar sodium hydroxide solution in 100 ml of water was added dropwise to the suspension with stirring. The resultant pigment was filtered out, washed and dried at 60° C. Indirect printing and stoving were then performed as usual. The CIE-Lab color values were:

L*=52.0; a*=27.7; b*=+5.8.

EXAMPLE 5

A suspension of 100 ml of water, 60 ml of a concentrated ammonia solution and 30 g of quartz powder ($SiO_2$) was made up as the initial mixture. A solution prepared from 17.5 g of tin tetrachloride.5 $H_2O$ and 0.2 g of gold in form of $HAuCl_4$.$H_2O$ in 80 ml of water was added dropwise to the suspension with stirring. The final pH value was less than 10. The resultant pigment was filtered out, washed and dried at 60° C. The pigment was converted into a paste in the conventional manner, applied onto glazed porcelain and stoved for 30 minutes at 1220° C. The CIE-Lab color values were: L*=61.8; a*=11.8; b*=−2.1. The $SiO_2$ to $SnO_2$ ratio was 4, the gold content, relative to $SiO_2$ plus $SnO_2$, was 0.53 wt. %.

EXAMPLE 6

The pigment obtained according to Example 1 was mixed with 0.01% of permanent red (Hoechst). In this manner, a pigment powder having a similar color to the subsequent fired color was obtained. The powder was applied in a similar manner to Example 1 onto a glazed porcelain surface and stoved (1220° C., 30 minutes). Virtually no difference compared to the result obtained from Example 1 was found: L*=48.2; a*=33.3; b*=−4.1.

EXAMPLE 7

50 ml of tetraethyl orthosilicate were stirred into a suspension prepared from 0.18 g of $NaAuCl_4$ (=0.1 g Au), 9 g of $ZrO_2$, 25 ml of ethanol and 25 ml of concentrated hydrochloric acid. This mixture was stirred for 5 hours and then dried at 60° C. in a drying cabinet. A grey-violet pigment was obtained.

EXAMPLE 8

26 g of a high temperature rapid firing (HTS) frit (no. 10150 from Cerdec AG), 20 ml of concentrated ammonia solution and 100 ml of water were placed in a glass beaker. A solution of 15.3 g of tin tetrachloride pentahydrate and 0.36 g of $HAuCl_4$.$H_2O$ (=0.2 g Au) in 60 ml of water was then added dropwise with stirring. The resultant light yellow suspension was combined with 160 ml of a 5 wt. % $H_3PO_2$ solution and heated to 80° C. for 2 hours. After some time, the suspension exhibited the color typical of purple colorants. The resultant pigment was filtered out, washed and dried at 60° C. The weight ratio of frit to $SnO_2$ was 4, the gold content (relative to frit plus $SnO_2$) was 0.61 wt. %. After conventional application and firing (1220° C., 30 minutes), the CIE-Lab values were: L*=53.6; a*=28; b*=−4.2.

EXAMPLE 9

5 g of the pigment obtained according to Example 1 were suspended in 50 ml of water. 10 ml of an 8 wt. % hydrazinium hydroxide solution were then stirred in and the mixture stirred for 1 hour. The suspension turned a grey color. The resultant purple pigment was filtered out, washed and dried at 60° C. and then applied using a known indirect screen printing method onto a porcelain surface and stoved for 30 minutes at 1220° C. The typical CIE-Lab values for a purple colorant were found: L*=42.7; a*=28.1; b*=−5.1.

EXAMPLE 10

5 g of the pigment obtained according to Example 1 were suspended in 50 ml of water. 10 ml of a 5 wt. % $H_3PO_2$ solution were then stirred in and the mixture stirred for 1 hour at 80° C. The suspension turned a blue-violet color. The resultant pigment was filtered out, washed and dried at 60° C. and then applied using a known indirect screen printing method onto a porcelain surface and stoved for 30 minutes at 1220° C. The typical purple color was found. Hunter color values were: L=30; a=31; b=−2, corresponding to CIE-Lab values: L*=36.0; a*=38.0; b*=−2.8.

EXAMPLE 11

The pigment obtained according to Example 1 was heat treated in a fluidized bed for 2 hours at 250° C. A grey-violet pigment was obtained. The resultant pigment was applied using a known indirect screen printing method onto a porcelain surface and stoved for 30 minutes at 1220° C. The typical purple color was found. Hunter color values were: L=38.8; a=18.5; b=−1.9, corresponding to CIE-Lab values: L*=45.5; a*=22.6; b*=−2.4.

EXAMPLE 12

The following parameters were investigated: (i) the influence of the weight ratio of support material to oxide hydrate, calculated as oxide, and (ii) the influence of firing temperature. The unreduced pigments were produced in a similar manner to Example 1. The support material used was a high temperature rapid firing frit (no. 10150 from Cerdec AG), $SnCl_4.5\ H_2O$ was used as the oxide hydrate-forming compound and $HAuCl_4.H_2O$ as the soluble gold compound. The weight ratio of glass frit to $SnO_2$ was 4. The gold content (relative to frit plus $SnO_2$) of all the pigments was 1.3 wt. %. After coprecipitation, the pigments were washed and dried (at 60° C.) and then converted into a paste in a similar manner to Example 1, the paste applied by indirect screen printing onto a glazed porcelain surface and stoved for 30 minutes at 1220° C.

The L*a*b* values to DIN 5033 (part 3) may be found in the following table. It may be concluded from these values that (i) the color values are only slightly dependent upon the ratio of support material to oxide hydrate, calculated as oxide, and (ii) the pigments exhibit elevated thermal stability, i.e. they fade only slightly if they are stoved at 1220° C. instead of at 1140° C. or 1180° C.

TABLE

| Stoving temperature | Weight ratio of frit to oxide hydrate, calc. as oxide | CIE-Lab | | |
|---|---|---|---|---|
| | | L* | a* | b* |
| 1140° C. | 9 | 38.6 | 27.1 | −1.6 |
| | 4 | 37.8 | 31.0 | −1.9 |
| | 2.3 | 38.6 | 27.6 | −1.8 |
| | 1.5 | 40.6 | 26.7 | −2.1 |
| | 1 | 40.4 | 27.6 | −2.1 |
| 1180° C. | 9 | 39.6 | 24.3 | −1.0 |
| | 4 | 39.5 | 27.5 | −1.8 |
| | 2.3 | 39.5 | 26.3 | −1.9 |
| | 1.5 | 41.2 | 25.2 | −2.3 |
| | 1 | 38.9 | 27.9 | −1.9 |
| 1220° C. | 9 | 45.7 | 19.2 | +0.8 |
| | 4 | 41.1 | 23.3 | −0.4 |
| | 2.3 | 42.7 | 21.7 | 0.0 |
| | 1.5 | 44.3 | 21.2 | −1.8 |
| | 1 | 42.2 | 23.0 | −2.5 |

COMPARATIVE EXAMPLE 13

Coprecipitation was performed in a similar manner to Example 1 using $SnCl_4.5\ H_2O$ and $HAuCl_4.H_2O$, but in the absence of a frit. The frits were mixed in subsequently.

Composition was the same as Example 1 with 1.34 wt. % Au and a weight ratio of frit to oxide hydrate, calculated as oxide, of 4. The L*a*b* values may be found in the following table.

| | CIE-Lab | | |
|---|---|---|---|
| | L* | a* | b* |
| Example 1 (according to the invention) | 45.8 | 34.9 | −3.9 |
| Comparative Example 13 (not according to the invention) | 73.6 | 8.6 | −2.1 |

EXAMPLE 14

Reduced pigments: the influence of the quantity of reducing agent used in the reduction of 10 g portions of the unreduced pigment obtained according to Example 1 was examined. After conventional application and firing, the pigment color values were:

| | | 1 ml $H_3PO_2$ (50 %) | 10 ml $H_3PO_2$ (50 %) |
|---|---|---|---|
| L* | CIE-Lab | 36.0 | 54.5 |
| a* | | 38.5 | 15.9 |
| b* | | −2.5 | −2.3 |

EXAMPLE 15 a) 17.5 g of a high temperature rapid firing (HTS) frit (no. 90234 from Cerdec AG), 10 ml of 25% ammonia and 60 ml of water were placed as the initial mixture in a glass beaker. A solution prepared from 10.18 g of tin tetrachloride pentahydrate ($SnCl_4.5\ H_2O$), 0.29 g of Au, in the form of tetrachloroauric acid, and 50 ml of water were then added dropwise within 10 minutes with stirring. Addition was performed at room temperature and the pH value fell from 11.8 to 3.3 during addition. The resultant white coprecipitate was filtered out, washed and dried at 70° C. The resultant pigment, which directly constitutes a decorative colorant, was converted into a paste with a printing medium (80820 from Cerdec AG) (56 parts by weight of pigment and 44 parts by weight of medium), applied onto a glazed porcelain surface using a known indirect screen printing method (100 T screen fabric) and stoved at 1220° C. in a 90 minute firing cycle in a gas pushed-bat oven. Color values were measured using a Hunter Lab spectrophotometer and converted into L*, a* and b* values of the CIE-Lab system (DIN 5033, part 3):

L*=82.15; a*=6.56; b*=−1.77 b) and c):

Example 15a was repeated with the difference that the quantity of ammonia solution used during coprecipitation was increased while maintaining a constant batch size. The quantities of $NH_3$ used, the initial and final pH values together with the L*a*b* values of the stoved pigments may be found in the following table:

| Example no. | 15 a | 15 b | 15 c |
|---|---|---|---|
| ml $NH_3$ solution (25 %) | 10 | 20 | 40 |
| Initial pH | 11.8 | 12.1 | 12.5 |
| Final pH | 3.3 | 9.6 | 10.3 |
| L* | 82.1 | 46.2 | 36.7 |
| a* | 6.6 | 25.9 | 29.3 |
| b* | −1.8 | −2.9 | −1.4 | d), e) and f):

Half of each of the coprecipitates produced according to Examples 15a to 15c were suspended in 50 ml of water as a moist filter cake. 1 g of hypophosphorous acid (50%) was added to each and the mixture stirred for 2 hours at 80° C. The purple coprecipitate obtained in each case was filtered out, washed and dried at 70° C. Printing and drying were performed in a similar manner as in Examples 15a to 15c. The L*a*b* values may be found in the following table:

| Example no. | 15 d | 15 e | 15 f |
|---|---|---|---|
| Coprecipitate used in the reduction stage from Example no. | 15 a | 15 b | 15 c |
| L* | 74.2 | 47.5 | 41.6 |
| a* | 15.1 | 25.5 | 24.8 |
| b* | −4.2 | −3.8 | −2.2 |

EXAMPLE 16

A solution prepared from 10.18 g of tin tetrachloride pentahydrate ($SnCl_4.5\ H_2O$), 0.29 g of gold, in the form of tetrachloroauric acid, and 50 ml of water together with 17.5 g of a high temperature rapid firing (HTS) frit (no. 90234 from Cerdec AG) were introduced as the initial mixture into a glass beaker. 0.49 g of sodium sulphide (~35%), dissolved in 12 ml of 5 molar sodium hydroxide solution were then added dropwise within 10 minutes with stirring. Addition was performed at room temperature and the pH value rose during addition from 0.15 to 0.86. The resultant dark brown coprecipitate was filtered out, washed and dried at 70° C. The resultant decorative colorant was converted into a paste in the conventional manner with a printing medium (80820 from Cerdec AG) (57 parts by weight of pigment and 43 parts by weight of medium), applied onto a glazed porcelain surface by indirect screen printing with a 100 T screen fabric and stoved at 1220° C. in a 90 minute firing cycle in a gas pushed-bat oven. Color values were measured using a Hunter Lab spectrophotometer and converted into L*, a* and b* values of the CIE-Lab system:

L*=58.49; a*=15.24; b*=−0.90

EXAMPLE 17

17.5 g of a high temperature rapid firing (HTS) frit containing lead (no. 90234 from Cerdec AG; grain size distribution 90% smaller than 10 μm), 12 ml of 5 molar sodium hydroxide solution and 0.49 g of sodium sulphide (~35%), dissolved in 50 ml of water, were introduced as the initial mixture into a glass beaker. A solution of 10.18 g of tin tetrachloride pentahydrate ($SnCl_4.5\ H_2O$), 0.29 g of Au, in the form of tetrachloroauric acid, and 50 ml of water were added dropwise within 10 minutes with stirring to this strongly alkaline suspension of a pH of 13.30. Addition was performed at room temperature. At the end of coprecipitation, the pH value was 1.1. The resultant brown coprecipitate was filtered out, washed and dried at 70° C. Once printed and fired, this decorative colorant yielded the following color values L*=44.0; a*=31.8; b*=−4.9

It is clear from a comparison of the color values of Examples 15, 16 and 17, that, given an identical support material and oxide hydrate, an identical ratio of support material to oxide hydrate and an identical gold content, the type of coprecipitation and the precipitating agent have a decisive influence on the color of the pigment (=decorative colorant).

EXAMPLE 18

17.5 g of a lead-free high temperature rapid firing (HTS) frit (no. 901368 from Cerdec AG, substantially consisting of $SiO_2$, CaO, $Al_2O_3$, $B_2O_3$ and $Na_2O$; grain size distribution 90% smaller than 8 μm), 20 ml of 5 molar sodium hydroxide solution, 0.49 g of sodium sulphide (~35%), dissolved in 50 ml of water, are introduced as the initial mixture into a glass beaker. A solution prepared from 10.18 g of tin tetrachloride pentahydrate ($SnCl_4.5\ H_2O$), 0.29 g of Au, in the form of tetrachloroauric acid, and 50 ml of water were then added dropwise within 10 minutes with stirring. The pH value was 1.9 at the end of coprecipitation. The resultant brown coprecipitate obtained at room temperature was filtered out, washed and dried at 70° C. Once printed and fired, this pigment, which was directly tested as a decorative colorant, yielded the following color values:

L*=47.6; a*=29.0; b*=−4.5

EXAMPLE 19

25 g of a high temperature rapid firing (HTS) frit (no. 90234 from Cerdec AG, consisting of $SiO_2$, PbO, CaO, $B_2O_3$ and $SnO_2$; grain size distribution 90% smaller than 10 μm), 50 ml of concentrated ammonia solution and 200 ml of water were introduced as the initial mixture into a glass beaker. A mixture of a solution prepared from 17.5 g of tin tetrachloride pentahydrate ($SnCl_4.5\ H_2O$) in 30 ml of water and 37 ml of an aqueous gold colloid solution having an Au content of 10 mg/ml, produced from $HAuCl_4$ by reduction with formaldehyde, was then added dropwise within 15 minutes with stirring. Addition was performed at room temperature and the pH fell during addition from 12.5 to 9. The resultant purple coprecipitate was filtered out, washed and dried at 60° C.

The resultant pigment having an Au content of 1.13 wt. % was converted into a paste with a printing medium (80820 from Cerdec AG) (56 parts by weight of pigment and 44 parts by weight of medium) was applied by a known indirect screen printing method onto a glazed porcelain surface and stoved for 30 minutes at 1220° C. The color values were measured with a Hunter Lab spectrophotometer and converted into the L*, a* and b* values of the CIE-Lab system (DIN 5033, part 3):

L*=56.4; a*=22.0; b*=−4.1 (CIE-Lab)

What is claimed is:

1. A pigment having a gold content, suitable for the production of purple ceramic decoration in high temperature firing, consisting essentially of (a) at least one finely divided stovable support material, (b) at least one oxide hydrate of at least one of the metals selected from the group consisting of Al, Si, Sn, Pb, Ti, Zr, Nb, Ta, Sc, Y, La, Ce and Zn and (c) at least one water-insoluble gold(III) or gold(I) compound or colloidal gold, wherein the support material and oxide hydrate, calculated as oxide, are present in a weight ratio in the range from 10 to 0.1 and the gold content of the pigment is between 0.05 and 10 wt. %, said pigment being obtained by a process comprising providing an aqueous or aqueous-organic phase containing at least one soluble Au compound or colloidal gold, at least one soluble compound of the metals and at least one precipitating agent, and coprecipitating the at least one oxide hydrate and the at least one water-insoluble gold compound or the colloidal gold in the presence of the support material from the aqueous or aqueous-organic phase in the absence of a reducing agent for the gold compound(s) to produce a coprecipitate, and, optionally, carrying out reduction following the coprecipitation with a reducing agent or by thermal decomposition at 100 to 300° C. to convert water-insoluble Au compounds present in the coprecipitate into colloidal gold.

2. A pigment according to claim 1 wherein the support material is a glass frit.

3. A pigment according to claim 1, which contains a glass frit as the support material and an oxide hydrate of Sn or Zr as the oxide hydrate, and wherein the weight ratio of glass frit to oxide hydrate, calculated as oxide, is in the range from 10 to 1.

4. A pigment according to claim 3 wherein the oxide hydrate is an oxide hydrate of Sn.

5. A pigment according to claim 1, wherein (c) comprises a gold(III) hydroxide, a gold(III) ammine hydroxide or gold sulphide, and the gold content of the pigment is between 0.5 and 5 wt. %.

6. A pigment according to claim 3, wherein (c) comprises a gold(III) hydroxide, a gold(III) ammine hydroxide or gold sulphide, and the gold content of the pigment is between 0.5 and 5 wt. %.

7. A pigment according to claim 1, wherein (c) comprises colloidal gold, in a quantity of 0.5 to 2.5 wt. % which is obtained by reduction of the water-insoluble gold compound present in the coprecipitate, using a reducing agent selected from the group consisting of an aldehyde, hydrazine, a sulphite, a dithionite, a thiosulphate, a phosphite, hypophosphorous acid and a hypophosphite.

8. A pigment according to claim 7, wherein the gold compound present in the coprecipitate is gold(III) hydroxide or gold(III) ammine hydroxide.

9. A pigment according to claim 1, wherein at least one substance selected from the group consisting of alkali metal hydroxide, alkali metal carbonate, alkali metal sulphide and ammonia is used as the precipitating agent and the pH value at the end of coprecipitation is in the range of from approx. 0.5 to approx. 10.5.

10. In a method for the production of a purple ceramic decoration, which comprises applying a pigment to a ceramic support to be decorated and firing the pigment at above 1000° C., the improvement wherein the pigment is a pigment according to claim 1.

11. A process for the production of a pigment having a gold content, suitable for the production of purple ceramic decoration in high temperature firing, consisting essentially of (a) at least one finely divided stovable support material, (b) at least one oxide hydrate of at least one of the metals selected from the group consisting of Al, Si, Sn, Pb, Ti, Zr, Nb, Ta, Sc, Y, La, Ce and Zn and (c) at least one water-insoluble gold(III) or gold(I) compound, wherein the support material and oxide hydrate, calculated as oxide, are present in a weight ratio in the range from 10 to 0.1 and the gold content of the pigment is between 0.05 and 10 wt. %, said process comprising providing an aqueous or aqueous-organic phase containing the support material suspended therein, at least one water-soluble Au compound, at least one soluble compound of the metals and at least one precipitating agent, coprecipitating the at least one oxide hydrate and the at least one water-insoluble gold compound from the aqueous or aqueous-organic phase in the absence of a reducing agent for the gold compound(s) to produce a coprecipitate, and separating and drying the coprecipitate.

12. A process for the production of a pigment having a gold content, suitable for the production of purple ceramic decoration in high temperature firing, consisting essentially of (a) at least one finely divided stovable support material, (b) at least one oxide hydrate of at least one of the metals selected from the group consisting of Al, Si, Sn, Pb, Ti, Zr, Nb, Ta, Sc, Y, La, Ce and Zn and (c) colloidal gold, wherein the support material and oxide hydrate, calculated as oxide, are present in a weight ratio in the range from 10 to 0.1 and the gold content of the pigment is between 0.05 and 10 wt. %, said process comprising providing an aqueous or aqueous-organic phase containing the support material suspended therein, colloidal gold, at least one soluble compound of the metals and at least one precipitating agent, coprecipitating the at least one oxide hydrate and the colloidal gold from the aqueous or aqueous-organic phase in the absence of a reducing agent for the gold compound(s) to produce a coprecipitate, and separating and drying the coprecipitate.

13. A process for the production of a pigment having a gold content, suitable for the production of purple ceramic decoration in high temperature firing, consisting essentially of (a) at least one finely divided stovable support material, (b) at least one oxide hydrate of at least one of the metals selected from the group consisting of Al, Si, Sn, Pb, Ti, Zr, Nb, Ta, Sc, Y, La, Ce and Zn and (c) colloidal gold, wherein the support material and oxide hydrate, calculated as oxide, are present in a weight ratio in the range from 10 to 0.1 and the gold content of the pigment is between 0.05 and 10 wt. %, said process comprising providing an aqueous or aqueous-organic phase containing the support material suspended therein, at least one water-soluble Au compound, at least one soluble compound of the metals and at least one precipitating agent, coprecipitating the at least one oxide hydrate and the at least one water-insoluble gold compound from the aqueous or aqueous-organic phase in the absence of a reducing agent for the gold compound(s) to produce a coprecipitate, and either (1) treating the coprecipitate in the aqueous phase with a reducing agent and then separating and drying the resultant reduced product, or (2) separating and drying the coprecipitate and heat treating the separated coprecipitate at 100 to 300° C.

14. A process according to claim 11, 12 or 13, wherein at least one precipitating agent selected from the group consisting of alkali metal hydroxide, alkali metal carbonate, alkali metal sulphide and ammonia are used for the coprecipitation, wherein (i) the precipitating agent is initially introduced into a suspension containing the support material to produce an initial mixture, and a solution of an oxide hydrate-forming compound and a solution of a gold compound or of colloidal gold, or a mixture of the solution of an oxide hydrate-forming compound and the solution of a gold compound or of colloidal gold are introduced into the initial mixture or (ii) a solution of an oxide hydrate-forming compound and an aqueous solution of the precipitating agent are introduced into a suspension containing the support material and a dissolved gold compound or colloidal gold.

15. A process according to claim 11, 12 or 13,
wherein coprecipitation is performed in such a manner to achieve a final pH value in the range of from approx. 0.5 to 12.

16. A process according to claim 15 wherein the final pH value is in the range of from approx. 0.5 to 10.5.

17. A process according to claim 11, 12 or 13, wherein a glass frit is used as the support material, a tin(IV) compound is used as the soluble compound of the metals contained in the oxide hydrate, and a hydrate of $HAuCl_4$ is used as the water-soluble gold compound.

18. A process according to claim 17 wherein the tin(IV) compound is $SnCl_4.5\ H_2O$.

19. A process according to claim 13,
wherein a reducing agent selected from the group consisting of a dithionite, a thiosulphate, a sulphite, a phosphite, hypophosphorous acid, a hypophosphite, formaldehyde, Urotropin, hydrazine, hydroxylamine, hyponitrite ($H_2N_2O_2$), oxohyponitrite ($H_2N_2O_3$) and glucose is used as the reducing agent.

* * * * *